(12) United States Patent
Ogawa (10) Patent No.: US 11,745,335 B2
(45) Date of Patent: Sep. 5, 2023

(54) SUPPORT STRUCTURE, ROBOT AND PARALLEL LINK ROBOT

(71) Applicant: FANUC CORPORATION, Yamanashi (JP)

(72) Inventor: Reishin Ogawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 127 days.

(21) Appl. No.: 16/950,977

(22) Filed: Nov. 18, 2020

(65) Prior Publication Data
US 2021/0197364 A1 Jul. 1, 2021

(30) Foreign Application Priority Data
Dec. 26, 2019 (JP) .............................. JP2019-236379

(51) Int. Cl.
| | | |
|---|---|---|
| B25J 17/00 | (2006.01) | |
| B25J 9/10 | (2006.01) | |
| B25J 9/00 | (2006.01) | |
| B25J 9/16 | (2006.01) | |

(52) U.S. Cl.
CPC ............ B25J 9/106 (2013.01); B25J 9/0021 (2013.01); B25J 9/1623 (2013.01); B25J 17/00 (2013.01)

(58) Field of Classification Search
CPC ...... B25J 9/0012; B25J 9/1623; B25J 9/0051; B25J 19/0062; B25J 9/003; B25J 19/0075; B25J 19/0058; F16J 15/16; F16J 15/184; F16J 15/186; F16J 15/3272; F16B 7/044; F16B 7/04; F16B 7/0433; F16C 29/002; F16C 29/02; F16C 29/08; F16C 29/088; F16C 29/084; F16C 29/086
See application file for complete search history.

(56) References Cited

U.S. PATENT DOCUMENTS

| | | | | | |
|---|---|---|---|---|---|
| 2,346,972 | A | * | 4/1944 | Kishline | ............... F16F 15/145 74/574.2 |
| 3,642,290 | A | * | 2/1972 | Millsap | ................ F16J 15/3208 277/556 |
| 8,113,083 | B2 | * | 2/2012 | Breu | ...................... B25J 9/0051 74/490.03 |
| 9,806,457 | B2 | * | 10/2017 | Watanabe | ............ B25J 11/0045 |
| 2003/0189292 | A1 | * | 10/2003 | Bjornson | ............. F16J 15/3488 277/370 |
| 2004/0035574 | A1 | * | 2/2004 | Pippert | ................... E21B 21/02 166/90.1 |
| 2004/0143876 | A1 | * | 7/2004 | Persson | ................. B25J 9/0051 901/1 |
| 2006/0140525 | A1 | * | 6/2006 | Giberson | ................ F16C 35/04 384/428 |

(Continued)

FOREIGN PATENT DOCUMENTS

JP 2019-038051 A 3/2019

*Primary Examiner* — Gregory Robert Weber
(74) *Attorney, Agent, or Firm* — Studebaker & Brackett PC (57) ABSTRACT

Provided is a support structure comprising a link member (a rod-like member), a clamp member disposed to surround the link member, and an elastic member disposed between the link member and the clamp member, the support structure supports the link member inside the clamp member via the elastic member, and the elastic member comprises a liquid impermeable material, and fills a space between the link member and the clamp member.

11 Claims, 10 Drawing Sheets

(56) References Cited

U.S. PATENT DOCUMENTS

| | | | | |
|---|---|---|---|---|
| 2007/0126229 A1* | 6/2007 | Krowech | ............... | F16L 5/10 |
| | | | | 285/189 |
| 2008/0272555 A1* | 11/2008 | Taylor | ............... | F16J 15/26 |
| | | | | 277/540 |
| 2009/0174149 A1* | 7/2009 | Takahashi | ............ | F16J 15/3488 |
| | | | | 277/370 |
| 2012/0112421 A1* | 5/2012 | Sato | ............... | F16J 15/38 |
| | | | | 83/17 |
| 2021/0190141 A1* | 6/2021 | Takemura | ............ | F16C 29/0609 |

* cited by examiner

SUPPORT STRUCTURE, ROBOT AND PARALLEL LINK ROBOT

This application is based on and claims the benefit of priority from Japanese Patent Application No. 2019-236379, filed on Dec. 26, 2019, the content of which is incorporated herein by reference.

BACKGROUND OF THE INVENTION

Field of the Invention

The present invention relates to a support structure that supports a rod-like member, a robot comprising the support structure, and a parallel link robot comprising the support structure.

Related Art

In recent years, in various industrial fields, a parallel link robot has been used as a robot, suitable for moving and handling a task object in a three-dimensional space. The parallel link robot comprises a parallel link mechanism including a plurality of arms arranged in parallel with one another to support a movable part disposed at a lower end, and the respective arms are driven and controlled by an actuator, to dispose the movable part at an arbitrary position in the three-dimensional space.

As a parallel link robot, there is known a parallel link robot comprising a base, a movable plate (a movable part), a plurality of arms coupling the base and the movable plate in parallel, and actuators arranged on the base to drive the arms, each of the arms comprises a drive link to be driven by the actuator, and a plurality of passive links coupled to the drive link via joints, and each of the passive links comprises two link members (rod-like members) parallel to each other (e.g., see Japanese Unexamined Patent. Application, Publication No. 2019-038051).

One arm of the parallel link robot disclosed in Japanese Unexamined Patent Application, Publication No. 2019-038051 is provided with an actuator for a wrist that drives a mounting member (a wrist shaft) mounted to the movable plate, and a fixing member that fixes this actuator for the wrist to the arm. The fixing member comprises a clamp component that supports two link members constituting the arm. The clamp component comprises a recess member that fits with the link member, and a flat plate member disposed opposite to the recess member via the link member fitted into the recess member, and the flat plate member and the recess member are tightened with bolts to fix the link member.

Patent Document 1: Japanese Unexamined Patent Application, Publication No. 2019-038051

SUMMARY OF THE INVENTION

In Japanese Unexamined Patent Application, Publication No. 2019-038051 described above, recognized is a state where a gap (space) is made between a clamp component and a link member. If the space is made between the clamp component and the link member, disadvantages occur that the gap is difficult to clean and liquid of cleaning fluid easily remains in the gap. Particularly, in a case where a parallel link robot is used in a food factory, such disadvantages have to be avoided from a hygiene perspective. Therefore, a structure that allows cleaning and drying to be easily and reliably performed, and which is usable hygienically, is desired.

A support structure according to an aspect of the present disclosure is a support structure comprising a rod-like member, a clamp member disposed to surround the rod-like member, and an elastic member disposed between the rod-like member and the clamp member, to support the rod-like member inside the clamp member via the elastic member, the elastic member comprising a liquid impermeable material, and filling a space between the rod-like member and the clamp member.

According to an aspect, cleaning and drying can be easily and reliably performed, and a structure can be used hygienically.

DETAILED DESCRIPTION OF THE INVENTION

Embodiment

Figure 1:
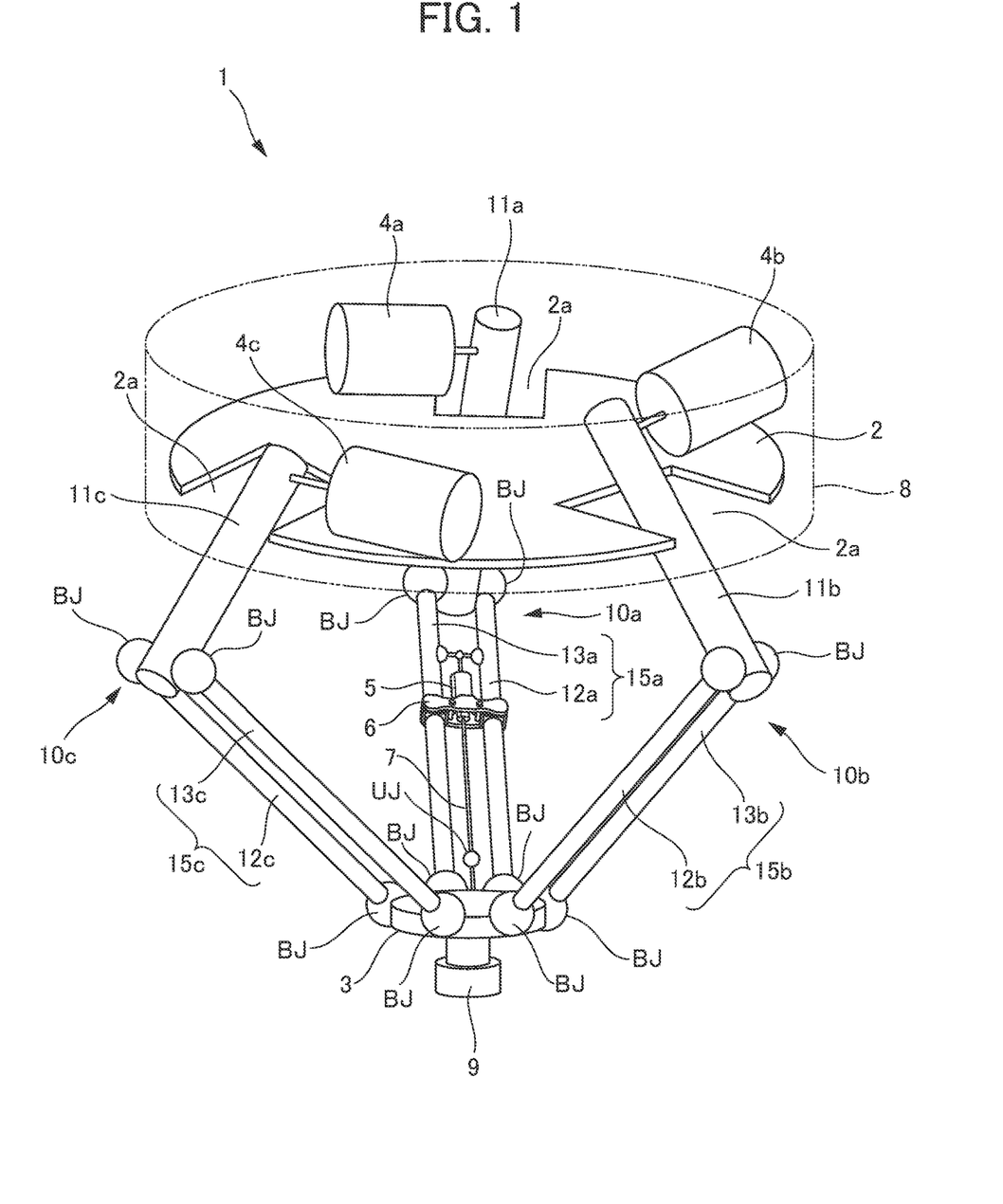
FIG. 1 is a perspective view showing a parallel link robot according to an embodiment of the present disclosure.

Hereinafter, description will be made as to an embodiment of the present disclosure with reference to the drawings. FIG. 1 shows a parallel link robot 1 comprising a support structure according to the embodiment of the present disclosure. As shown in FIG. 1, the parallel link robot 1 comprises a base 2 housed in a housing 8, a movable part 3 having a disk shape, three arms 10a to 10c coupling the base 2 and the movable part 3 in parallel, three actuators 4a to 4c arranged on the base 2 to drive the respective arms 10a to 10c, a mounting part 9 mounted to the movable part 3, an actuator for a wrist 5, a drive shaft 7 that transmits a driving force of the actuator for the wrist 5 to the mounting part 9, a fixing part 6 that fixes the actuator for the wrist 5 to the arm 10a, and a universal joint UJ provided in a middle of the drive shaft 7.

Note that in the following description, description about an upward-downward direction is based on arrangement of FIG. 1. Furthermore, phrases using the term "substantially" and representing geometric conditions, such as "substantially parallel", "substantially perpendicular", and "substantially rectangular" do not strictly specify meanings about the representation, and mean that conditions close to the geometric conditions are included in a range capable of achieving functions or effects of the present embodiment.

The base 2 has a disk shape. The base 2 at its circumferential part includes substantially rectangular cutout parts 2a in which after-mentioned drive links 11a to 11c of three arms 10a to 10c are arranged, respectively. The three arms 10a to 10c are arranged via equal spaces in a circumferential direction around a center axis of the base 2 extending in a vertical direction.

Each of the actuators 4a to 4c and actuator for the wrist 5 includes a servomotor and a reducer (each of which is not shown). The respective actuators 4a to 4c swing the respective coupled arms 10a to 10c about a horizontal axis along a planar direction of the base 2, respectively.

Driving of the respective actuators 4a to 4c is controlled to control a position of the movable part 3. The respective actuators 4a to 4c can move the movable part 3 while keeping a posture of the movable part 3 parallel with the base 2. The actuator for the wrist 5 drives the mounting part 9 to be rotated about a center axis of the movable part 3 via the drive shaft 7. The actuator for the wrist 5 is controlled, to control a rotation angle of the mounting part 9 to the movable part 3, so that a rotation angle of an end effector (not shown) mounted to the mounting part 9 is controlled.

The respective arms 10a to 10c have the same constitution. Therefore, the arm 10a is representatively described, to simplify the description of the arms 10b, 10c. The arm 10a includes the drive link 11a having one end attached to the actuator 4a, and a passive link 15a having one end swingably connected to the other end of the drive link 11a. The other end of the passive link 15a is swingably connected to the movable part 3.

The passive link 15a comprises two link members 12a, 13a that are parallel to each other. The link members 12a, 13a are hollow circular tubular members. Each of the link members 12a, 13a constitutes an example of a rod-like member of the present disclosure. One end and the other end of each of the link members 12a, 13a are swingably connected to the drive link 11a and the movable part 3 with ball joints BJ, respectively. Each of the ball joints BJ constitutes an example of a joint of the present disclosure. The drive link 11a, the movable part 3 and two link members 12a, 13a constitute a parallel four-section link. Even if an angle of the two link members 12a, 13a to the drive link 11a changes, a quadrangle formed by connecting four ball joints BJ in order with a straight line is always constituted as a parallelogram.

The arms 10b, 10c having the same constitution as the arm 10a include the drive links 11b, 11c having the same constitution as the drive link 11a, respectively, and include passive links 15b, 15c having the same constitution as the passive link 15a, respectively. The passive links 15b, 15c include link members 12b, 13b and link members 12c, 13c, having the same constitution as the link members 12a, 13a, respectively.

Figure 2:
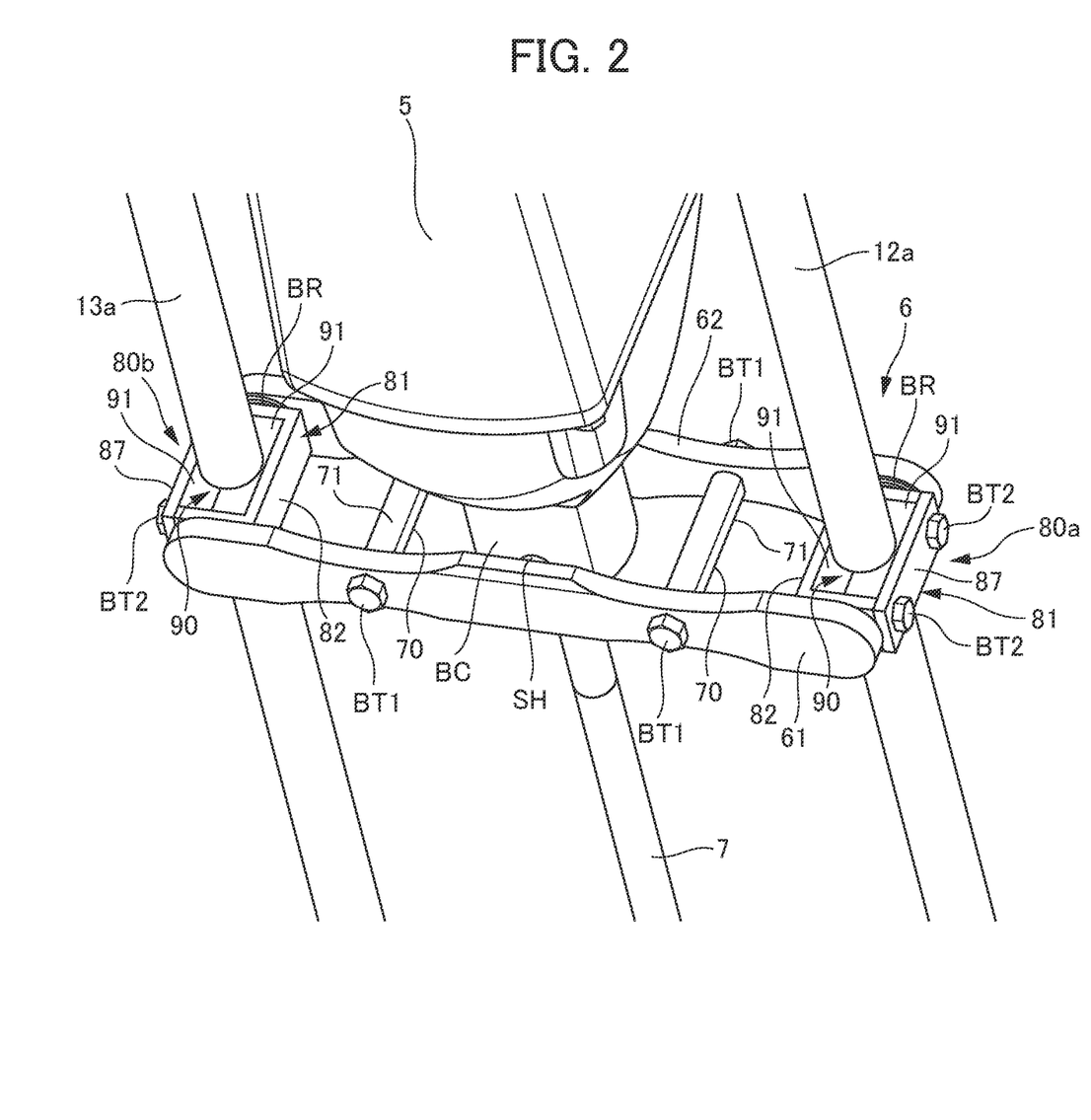
FIG. 2 is a perspective view showing a surrounding part of a fixing member provided in the parallel link robot according to the embodiment.
Figure 3:
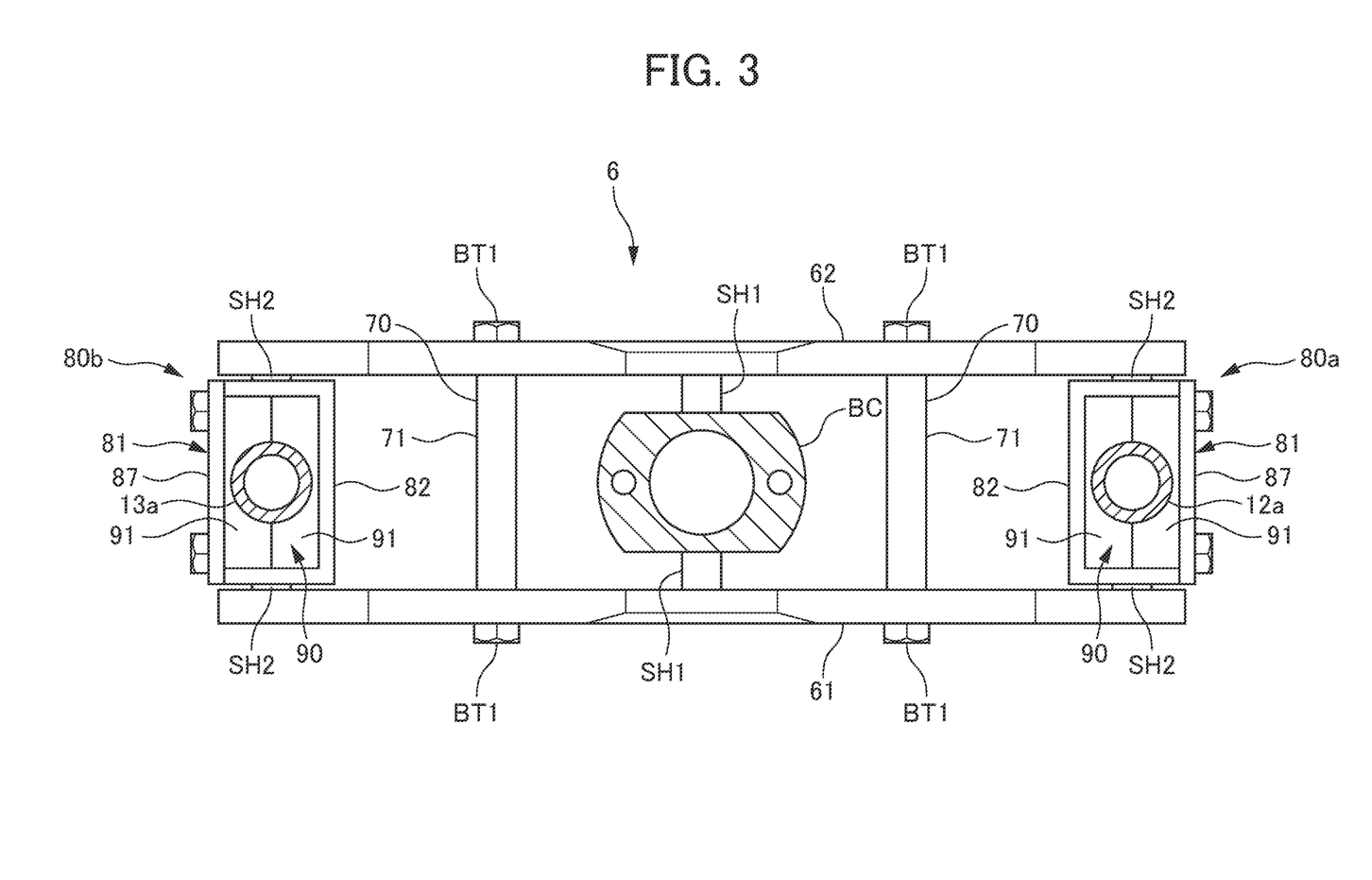
FIG. 3 is a partially cross-sectional plan view showing the above surrounding part of the fixing member.

As shown in FIGS. 2 and 3, the fixing part 6 comprises two long plate members 61, 62 fixed substantially in parallel with each other via a space by two fasteners 70, and support structures 80a, 80b supporting the respective link members 12a, 13a each of which is disposed between a corresponding pair of ends of the long plate members 61, 62.

The long plate members 61, 62 have a length over a space between two link members 12a, 13a. The long plate members 61, 62, extending substantially perpendicularly to the link members 12a, 13a, are arranged slightly below the actuator for the wrist 5. Each of the fasteners 70 includes a spacing member 71 disposed between the long plate members 61, 62, and a pair of bolts BT1 inserted into through holes (not shown) provided in the long plate members 61, 62 and screwed into opposite ends of the spacing member 71. The spacing member 71 is a cylindrical member extending along a space direction between the long plate members 61, 62, and includes therein an internal screw into which the bolt BT1 is screwed. The bolts BT1 inserted into the above through holes are screwed and fastened into the spacing member 71 disposed between the long plate members 61, 62, so that the long plate members 61, 62 are fixed in parallel with each other via the space.

A bracket BC provided at a tip (lower end) of the actuator for the wrist 5 is disposed between the long plate members 61, 62. The bracket BC is relatively rotatably supported with respect to the long plate members 61, 62 via a rotary shaft SH1 substantially parallel to the spacing member 71. The rotary shaft SH1 is provided integrally with the bracket BC. Each of the long plate members 61, 62 includes a bearing (not shown) rotatably supporting the rotary shaft SH1.

The support structures 80a, 80b support the link members 12a, 13a, respectively. The support structures 80a, 80b have the same constitution. Therefore, the support structure 80a is representatively described, to omit description of the support structure 80b. In the support structure 80b shown in FIGS. 2 and 3, elements of the same constitution are denoted with the same reference numerals as in the support structure 80a.

Figure 4:
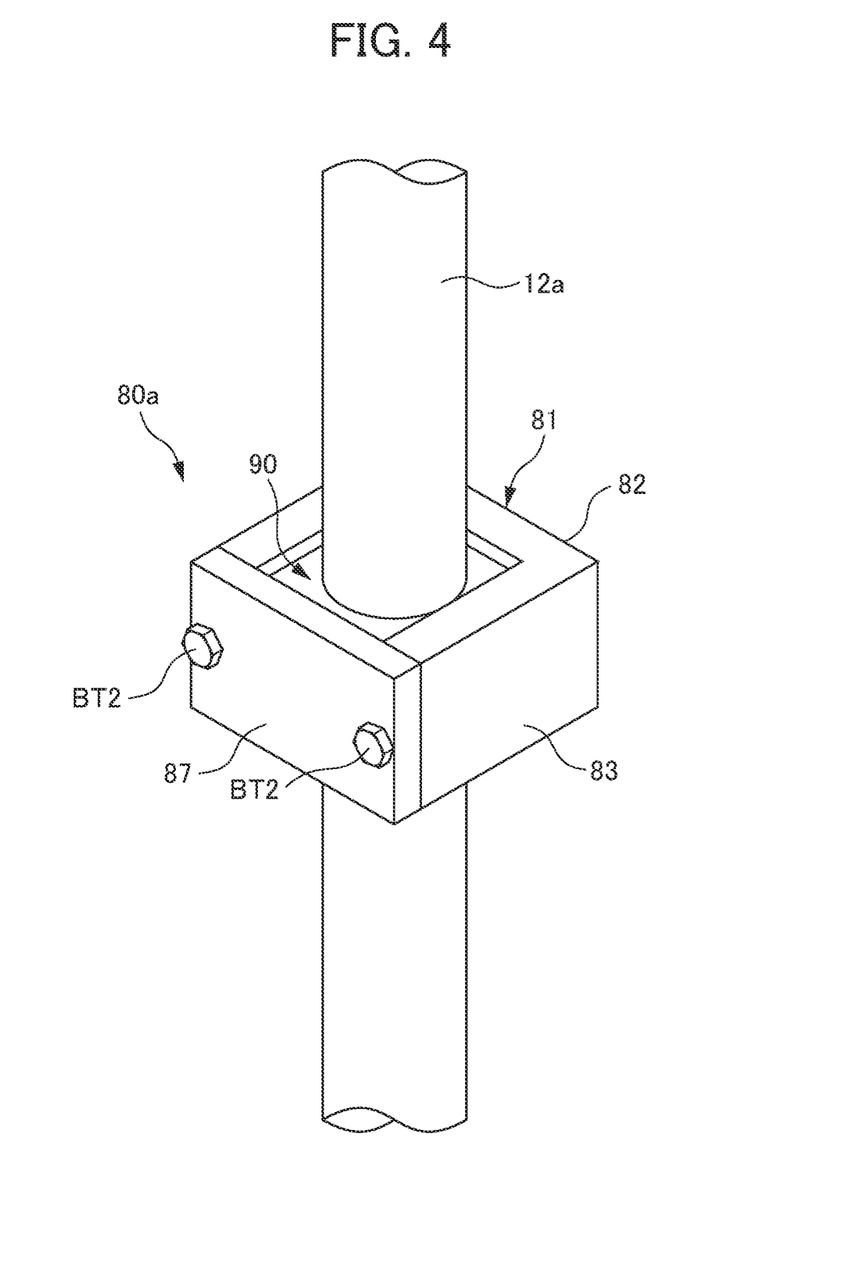
FIG. 4 is a perspective view showing a support structure according to the embodiment.

As shown in FIGS. 3 and 4, the support structure 80a comprises a clamp member 81 and an elastic member 90. In the present embodiment, the support structure 80a is further constituted of the link member 12a.

Figure 5:
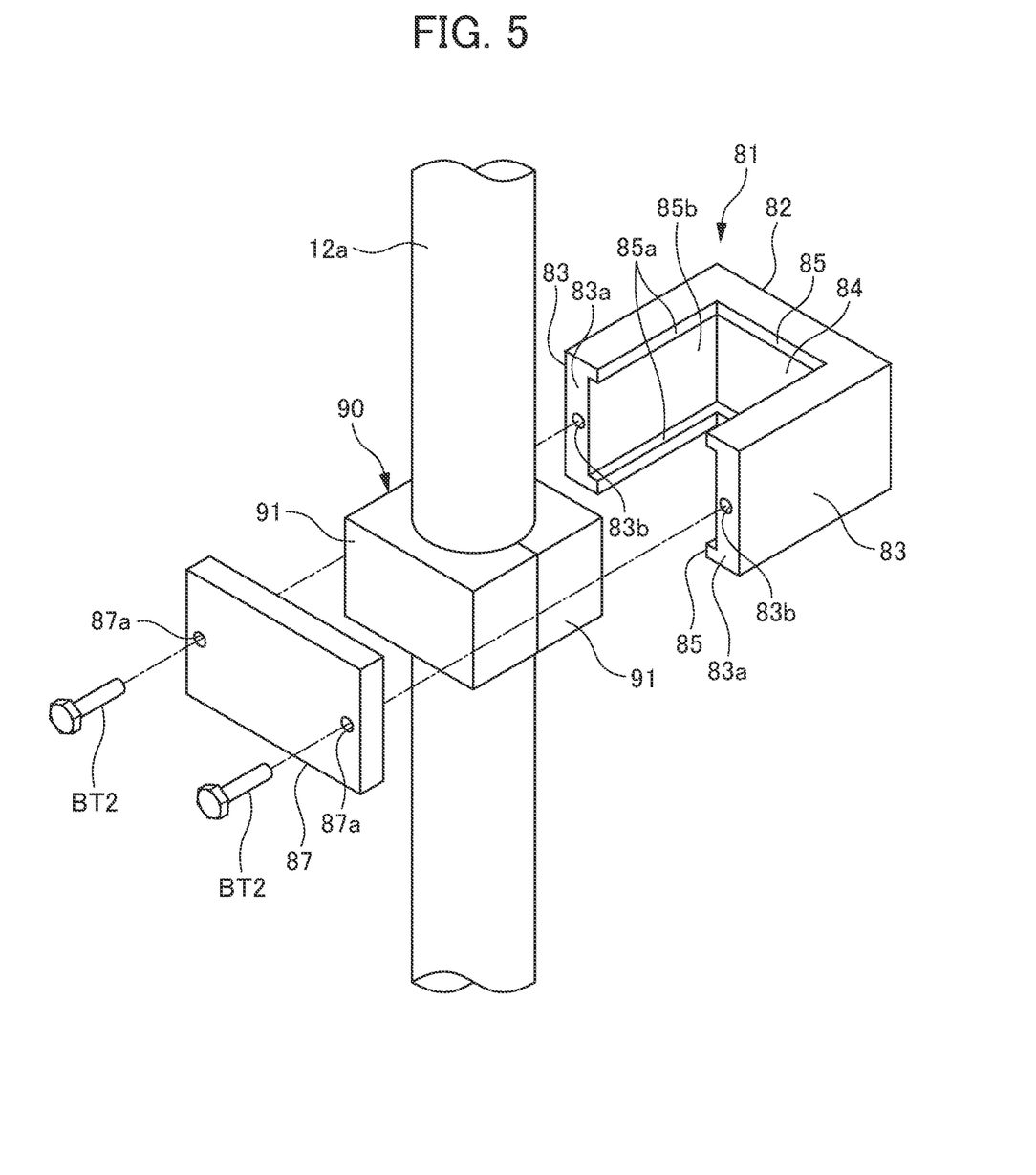
FIG. 5 is an exploded perspective view showing the support structure according to the embodiment.

The clamp member 81 is disposed to surround the link member 12a. As shown in FIG. 5, the clamp member 81 includes a U-shaped main body member 82 inside which the link member 12a is disposed, a rectangular flat plate member 87 disposed opposite to the main body member 82 via the link member 12a disposed inside the main body member 82, and bolts BT2 tightened to fix the flat plate member 87 to the main body member 82.

As shown in FIGS. 5 and 6A to 6C, the main body member 82 includes a pair of side plates 83 that face each other substantially in parallel, a middle plate 64 coupling the side plates 63 at one end, and a positioning part 85 that positions the elastic member 90 inside the clamp member 81.

Figure 6A:
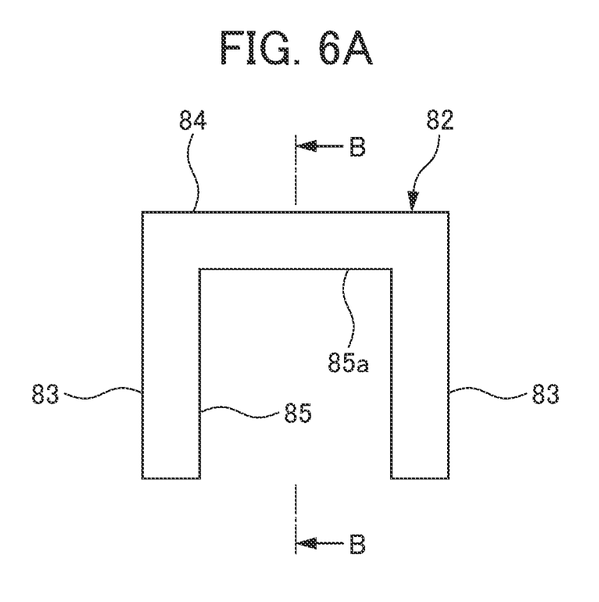
FIG. 6A is a plan view showing a main body member of a clamp member constituting the support, structure according to the embodiment.
Figure 6B:
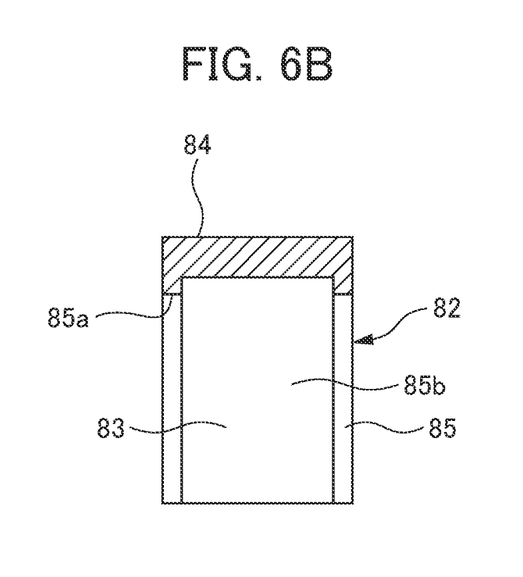
FIG. 6B is a view showing the main body member of the clamp member constituting the support structure according to the embodiment, and a cross-sectional view taken along the B-B line of FIG. 6A.
Figure 6C:
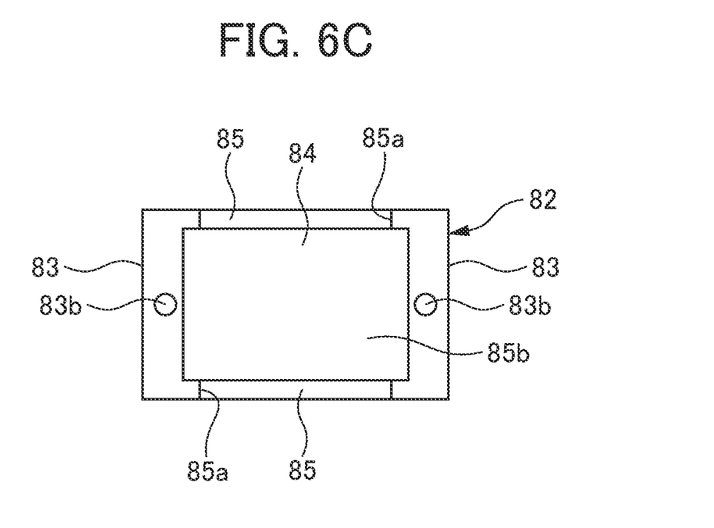
FIG. 6C is a front view showing the main body member of the clamp member constituting the support structure according to the embodiment.

The positioning part 85 is constituted of a pair of upper and lower protrusions 85a protruding to the inside of the main body member 82. Each of the protrusions 85a extends in a U-shape along an inner edge of the main body member 82 from one of the side plates 83 via the middle plate 84 to the other side plate 83. The protrusions 85*a* are provided integrally with the main body member 82. Inside the main body member 82 of the clamp member 81, formed is a recess 85*b* surrounded with the pair of protrusions 85*a*. The elastic member 90 is fitted into the recess 85*b*.

As shown in FIG. 3, the main body member 82 of the clamp member 81 is relatively rotatably supported with respect to the ends of the long plate members 61, 62 via a rotary shaft SH2 parallel to the rotary shaft SH1. The rotary shaft SH2 is provided on each of the side plates 83, for example, via an shaft fixing portion (not shown). As shown in FIG. 2, the long plate members 61, 62 have a bearing BR rotatably supporting the rotary shaft SH2.

As shown in FIG. 5, one through hole 87*a*, into which the bolt BT2 is inserted, is provided in each of opposite ends of the flat plate member 87 in a longitudinal direction. An end face 83*a* of each side plate 83 of the main body member 82 is provided with a screw hole 63*b* into which the bolt BT2 is screwed.

The elastic member 90 has a rectangular parallelepiped block shape as a whole. In the elastic member 90, an elastic and liquid impermeable material, such as any type of rubber, is used. The type of rubber constituting the elastic member 90 of the present embodiment is not limited, and a rubber for use in a seal material is suitable, such as urethane rubber, nitrile rubber, fluorine rubber, or silicone rubber.

Figure 7A:
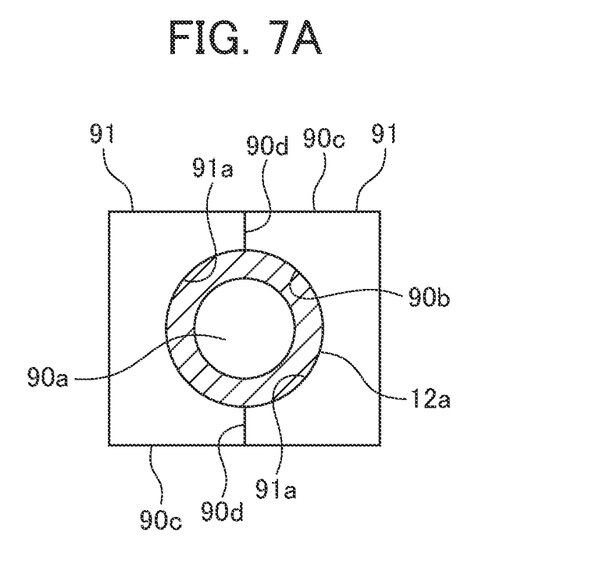
FIG. 7A is a plan view showing an elastic member constituting the support structure according to the embodiment, and showing a state where divided bodies of the elastic member are combined via a link member.
Figure 7B:
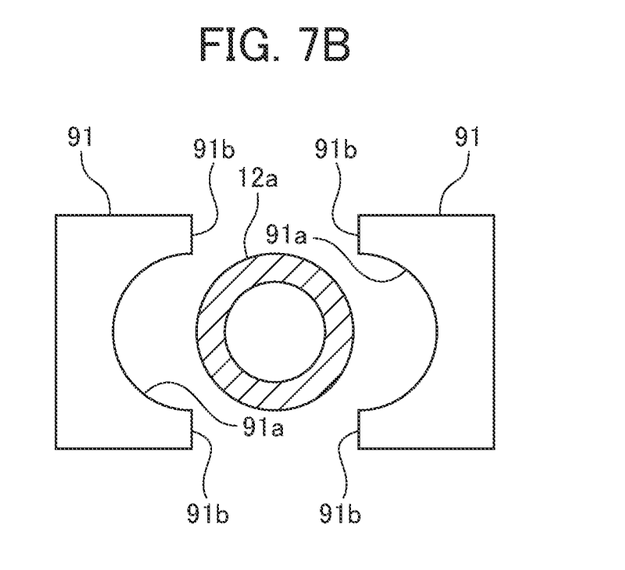
FIG. 7B is a plan view showing the elastic member constituting the support structure according to the embodiment, and showing a state where the divided bodies are separated from the link member.

As shown in FIGS. 7A and 7B, the elastic member 90 according to the present embodiment is constituted of two divided bodies 91 formed by dividing, into two equal bodies, a rectangular parallelepiped block including a cylindrical hole 90*a* in a center thereof. As shown in FIG. 7B, each of the divided bodies 91 includes a semicircular recess surface 91*a*, and flat dividing surfaces 91*b* on opposite sides of the recess surface 91*a*. The dividing surfaces 91*b* of two divided bodies 91 are aligned with each other, so that the hole 90*a* is formed inside respective recess surfaces 91*a*, as shown in FIG. 7A. The link member 12*a* is disposed concentrically with the hole 90*a*, and supported so that an outer circumferential surface of the member is in contact closely with the whole recess surface 91*a*.

FIG. 7A shows a state where two divided bodies 91 are combined to constitute the elastic member 90. The respective dividing surfaces 91*b* of the two divided bodies 91 are formed by providing two cuts 90*d* extending from an inner circumferential surface 90*b* of the hole 90*a*, formed by the pair of recess surfaces 91*a*, to a pair of side surfaces 90*c* parallel to each other. The inner circumferential surface 90*b* constitutes an example of a surface that faces the rod-like member of the present disclosure, and each side surface 90*c* constitutes an example of a surface that faces the clamp member of the present disclosure. As shown in FIG. 7B, a pair of mutually facing dividing surfaces 91*b* of the respective divided bodies 91 are separated, and the elastic member 90 is thereby removably mounted to the link member 12*a* in a direction substantially perpendicular to an extending direction of the link member 12*a*.

The elastic member 90 formed by combining two divided bodies 91 is guided by the upper and lower protrusions 85*a* to be fitted into the recess 85*b* of the main body member 82 of the clamp member 81. The elastic member 90 is fitted into the main body member 82 in a state where the center hole 90*a* is not closed with the main body member 82. The flat plate member 87 is aligned with the respective end faces 83*a* of the main body member 82, and the bolts BT2 inserted into the respective through holes 87*a* are screwed into the respective screw holes 83*b* to fasten the flat plate member 87 to the main body member 82, so that, the clamp member 81 is in an assembled state.

The link member 12*a* is disposed and supported in the hole 90*a* of the elastic member 90 of the support structure 80*a*. A procedure of supporting the link member 12*a* with the support structure 80*a* is as follows. First, one of the divided bodies 91 of the elastic member 90 is fitted into the recess 85*b* of the main body member 82 supported by the long plate members 61, 62 via the rotary shaft SH2. Then, the outer circumferential surface of the link member 12*a* is aligned with the recess surface 91*a* of the divided body 91, and the other divided body 91 is then fitted into the main body member 82 to bring the recess surface 91*a* into contact closely with the outer circumferential surface of the link member 12*a*. Then, the flat plate member 87 is fastened to the main body member 82 with the bolts BT2.

In this state where the link member 12*a* is supported by the support structure 80*a*, the elastic member 90 fills a space between the link member 12*a* and the clamp member 81. That is, the elastic member 90 has the whole surface, which faces the clamp member 81, in contact closely with an inner surface of the clamp member 81 without any gaps. The inner surface of the clamp member 81 described herein comprises inner surfaces of the side plates 83, the middle plate 84 and the protrusions 85*a* of the main body member 82 which form the recess 85*b* fitted with the elastic member 90, and an inner surface of the flat plate member 87. If the elastic member 90, elastically compressed, fills inside the clamp member 81, a close contact degree of the elastic member with the inner surface of the clamp member 81 is preferably high.

The parallel link robot 1 comprising the above constitution according to the embodiment of the present disclosure exhibits effects as follows.

The support structure 80*a*, 80*b* provided in the parallel link robot 1 comprises the link member 12*a*, 13*a*, the clamp member 81 disposed to surround the link member 12*a*, 13*a*, and the elastic member 90 disposed between the link member 12*a*, 13*a* and the clamp member 81, and supports the link member 12*a*, 13*a* inside the clamp member 81 via the elastic member 90, and the elastic member 90 comprises the liquid impermeable material, and fills the space between the link member 12*a*, 13*a* and the clamp member 81.

Consequently, the elastic member 90 is in contact closely with the link member 12*a*, 13*a*, and the elastic member 90 is in contact closely with the clamp member 81, without any gaps over an entire circumference of the link member 12*a*, 13*a*. Consequently, in a case where the parallel link robot 1 is cleaned by using liquid such as a cleaning fluid, disadvantages that the robot is difficult to clean due to presence of a gap and the liquid remains in the gap after the cleaning do not easily occur. This respect is effective especially in a case where the robot is used in an environment required to have high hygiene, such as a food factory. Therefore, with the support structures 80*a*, 80*b*, cleaning and drying can be easily and reliably performed, and the structures can be used hygienically.

The elastic member 90 is removably mounted to the link member 12*a*, 13*a* in the direction substantially perpendicular to the extending direction of the link member 12*a*, 13*a*.

Consequently, the elastic member 90 is easy to mount and remove, and the support structure 80*a*, 80*b* can be easily subjected to maintenance such as cleaning or inspection.

The elastic member 90 includes the pair of mutually facing dividing surfaces 91*b* obtained by providing at least one cut 90*d* extending from the inner circumferential surface 90*b* as a surface that faces the link member 12*a*, 13*a* to the side surface 90c as a surface that faces the clamp member 81, and the elastic member is removably mounted to the link member 12a, 13a by separating this pair of dividing surfaces 91b. In the present embodiment, the elastic member 90 includes two cuts 90d, and is thereby constituted of two divided bodies 91.

Consequently, the elastic member 90 that can be removably mounted in the direction substantially perpendicular to the extending direction of the link member 12a, 13a can be obtained with a simple constitution, and can be easily mounted and removed.

The support structures 80a, 80b comprise the positioning part 85 that positions the elastic member 90 in the clamp member 81.

Therefore, the elastic member 90 is held in a fixed state inside the clamp member 81 by the positioning part 85, and displacement or dropout of the elastic member 90 can be inhibited.

The positioning part 85 includes the protrusions 85a provided on the clamp member 81, and the elastic member 90 is guided into the clamp member 81 by the protrusions 85a to be mounted to the clamp member 81.

Consequently, the elastic member 90 is easily mounted to the clamp member 81, and a mounted position is held by the protrusions 85a.

The parallel link robot 1 according to the above embodiment is a robot comprising one or more ball joints BJ, and two or more link members 12a, 13a coupled with the ball joints BJ, and the link members 12a, 13a are supported by the support structures 80a, 80b, respectively. More specifically, the robot comprises the base 2, the movable part 3, the plurality of arms 10a to 10c coupling the base 2 and the movable part 3 in parallel, and the actuators 4a to 4c arranged on the base 2 to drive the arms 10a to 10c, respectively, the arms 10a to 10c comprise the drive links 11a to 11c to be driven by the actuators 4a to 4c, respectively, and the passive links 15a to 15c coupled to the drive links 11a to 11c with the ball joints BJ, respectively, each of the passive links 15a to 15c comprises two (a pair of) mutually parallel link members 12a and 13a, 12b and 13b, or 12c and 13c, and at least one of the link members 12a and 13a, 12b and 13b, or 12c and 13c is supported by the support structure 80a, 80b. In the present embodiment, two link members 12a and 13a of the passive link 15a are supported by the support structures 80a, 80b.

Consequently, in the parallel link robot 1, any gaps are not present between the elastic member 90 in the support structure 80a, 80b and the link member 12a, 13a and between the elastic member 90 and the clamp member 81, over the whole circumference of the link member 12a, 13a, and the members are in contact closely with each other. Therefore, in the case where the parallel link robot 1 is cleaned by using the liquid, such as the cleaning fluid, the disadvantages that the robot is difficult to clean due to the presence of the gap and the liquid remains in the gap after the cleaning do not easily occur. This respect is effective especially in the case where the robot is used in the environment required to have the high hygiene, such as the food factory. In consequence, the parallel link robot 1 can be easily and reliably cleaned and dried, and can be used hygienically.

Modification Example

Next, modification examples will be described in which a part of the above embodiment is modified. In the following description, the same components as in the above embodiment are denoted with the same reference numerals, description thereof is omitted, and differences will be mainly described.

Figure 8A:
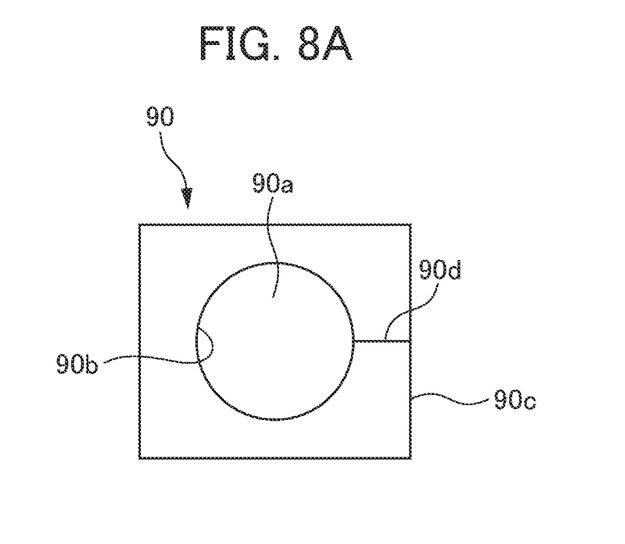
FIG. 8A is a plan view showing a modification example of the elastic member of the present disclosure, and showing a state where dividing surfaces are aligned to support a link member.
Figure 8B:
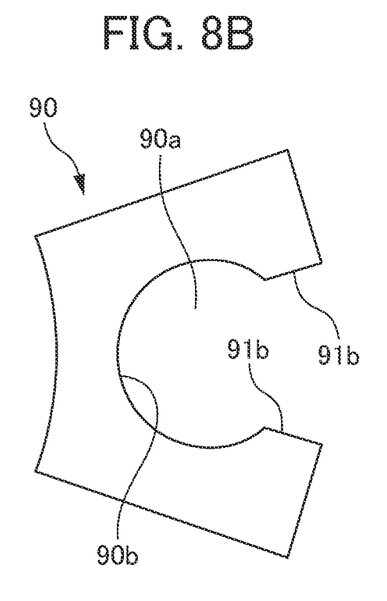
FIG. 8B is a plan view showing the modification example of the elastic member of the present disclosure, and showing a state where the dividing surfaces are separated and opened.

FIGS. 8A and 8B show a modification example of the elastic member 90. As shown in FIG. 8A, the elastic member 30 is provided with one cut 90d extending from an inner circumferential surface 90b of a hole 90a, in which a link member 12a, 13a is to be disposed, to one side surface 90c. The elastic member 90 includes a pair of dividing surfaces 91b that face each other via the cut 90d, as shown in FIG. 8B. As shown in FIG. 8B, the elastic member 90 is elastically deformed to separate the dividing surfaces 91b, so that the link member 12a, 13a can be passed between the separated dividing surfaces 91b. Consequently, the elastic member 90 can be removably mounted to the link member 12a, 13a in a direction substantially perpendicular to an extending direction of the link member 12a, 13a.

According to this modification example, the elastic member 90 is not constituted of two or more divided bodies, and the elastic member 90 is constituted of one member, so that a number of components can decrease.

Figure 9A:
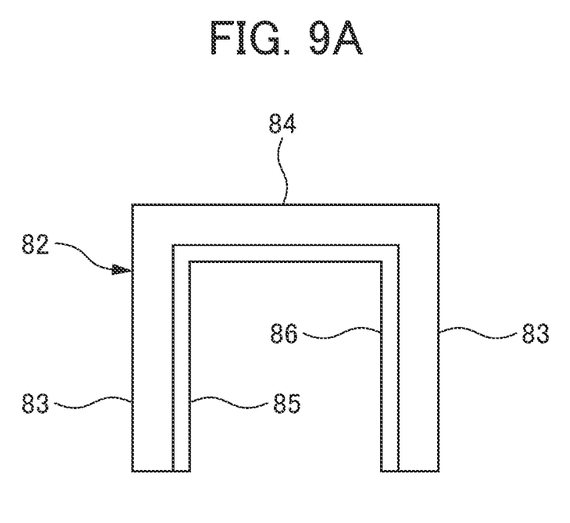
FIG. 9A is a view showing a modification example of a positioning part provided in a main body member of a clamp member, and a plan view of the main body member.
Figure 9B:
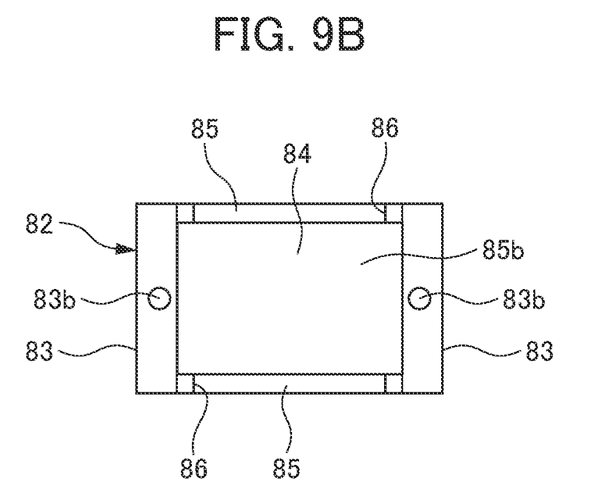
FIG. 9B is a view showing the modification example of the positioning part provided in the main body member of the clamp member, and a front view of the main body member.

FIGS. 9A and 9B show a modification example of the positioning part 85 disposed in the main body member 82 of the clamp member 81. The positioning part 85 in this case is constituted of a U-shaped rod material 86 that is separate from the main body member 82. In the above embodiment, the protrusions 85a are provided integrally with the main body member 82. On the other hand, this modification example is different from the above embodiment in that the rod material 86 is separate from the main body member 82. The rod material 86 is provided in the main body member 82 by a method, such as bonding or screwing. Note that the U-shaped rod material 86 may be integrally constituted, or may be constituted of three rod-like members divided by respective straight line portions.

If the positioning part 85 is separate in this manner, an inner surface of the main body member 82 may only be flat, thereby providing a manufacturing advantage that the main body member 82 is easy to prepare.

The present disclosure is not limited to the above embodiment, and can be appropriately modified. For example, the robot of the above embodiment is a so-called delta parallel link robot comprising three arms 10a to 10c, but may be another robot. For example, the robot may be a parallel link robot comprising four or more or two arms, and may be a serial link robot that does not comprise any parallel arms. The robot may be a robot comprising one or more joints (ball joints or the like), and two or more rod-like members (link members or the like) coupled via joints. The support structure of the present disclosure is not limited to application to such a robot as described above. Furthermore, the support structure of the present disclosure is not limited to a shape, combination or the like of the above embodiment and is not limited to any aspect, as long as the structure supports the rod-like member inside the clamp member via the elastic member.

EXPLANATION OF REFERENCE NUMERALS 1 parallel link robot (robot)
2 base
3 movable part
4a, 4b, and 4c actuator
10a, 10b, and 10c arm
11a, 11b, and 11c drive link
12a, 12b, 12c, 13a, 13b, and 13c link member (rod-like member)

15a, 15b, and 15c passive link
80a and 80b support structure
81 clamp member
85 positioning part
85a protrusion
90 elastic member
90b inner circumferential surface (facing surface)
90c side surface (facing surface)
90d cut
91 divided body
91b dividing surface
BJ ball joint (joint)

What is claimed is:

1. A support structure comprising:
a rod-like member;
a clamp member disposed to surround the rod-like member, the clamp member including a pair of side plates and a middle plate positioned to couple the pair of side plates to each other at one end of the pair of side plates, each of the pair of side plates including protrusions that extend toward each other; and
an elastic member disposed between the rod-like member and the clamp member,
wherein the support structure supports-the rod-like member inside the clamp member via the elastic member,
wherein the elastic member comprises a liquid impermeable material, and fills a space between the rod-like member and the clamp member,
wherein an outer peripheral surface of the elastic member is in direct contact with an inner surface of the clamp member around an entire circumference of the rod-like member without a gap into which cleaning fluid can enter and remain between the outer peripheral surface of the elastic member and the inner surface of the clamp member,
wherein the elastic member is removably mounted to the rod-like member in a direction substantially perpendicular to a lengthwise direction of the rod-like member, and
wherein the protrusions prevent movement of the elastic member past the protrusions in a direction parallel to the lengthwise direction of the rod-like member.

2. The support structure according to claim 1, wherein the elastic member includes a pair of mutually facing dividing surfaces obtained by providing at least one cut extending from a surface that faces the rod-like member to a surface that faces the clamp member, and the elastic member is removably mounted to the rod-like member by separating the pair of dividing surfaces.

3. The support structure according to claim 2, wherein the elastic member includes at least two cuts, and is thereby constituted of at least two divided bodies.

4. The support structure according to claim 2, wherein the elastic member is removably mounted to the rod-like member by separating the pair of dividing surfaces by initially moving portions of said elastic member on opposite sides of said at least one cut away from one another in a direction parallel to a tangent to a peripheral surface of the rod-like member adjacent the at least one cut.

5. A robot comprising:
one or more joints; and
two or more rod-like members coupled via the joints, the rod-like members being supported by the support structure according to claim 1.

6. A parallel link robot comprising:
a base;
a movable part;
a plurality of arms coupling the base and the movable part in parallel; and
a plurality of actuators disposed on the base to drive the plurality of arms;
wherein each of the plurality of arms comprises a drive link to be driven by each of the actuators, and a passive link coupled to the drive link via a joint,
wherein the passive link comprises two mutually parallel rod-like members, and
wherein at least one of the rod-like members is supported by the support structure according to claim 1.

7. The support structure according to claim 1, wherein the elastic member includes a cylindrical inner surface that surrounds and contacts a cylindrical outer surface of the rod-like member.

8. The support structure according to claim 1, wherein the clamp member and the elastic member each extends a spaced distance in a longitudinal direction that is a direction along the rod-like member, and the outer peripheral surface of the elastic member is in direct contact with the inner surface of the clamp member along the spaced distance without a gap between the outer peripheral surface of the elastic member and the inner surface of the clamp member.

9. The support structure according to claim 1, wherein a clamping direction of the clamp member is in a direction that is through the outer peripheral surface of the elastic member toward the rod-like member.

10. The support structure according to claim 1,
wherein the clamp member and the elastic member each extends a spaced distance in a longitudinal direction that is a direction along the rod-like member, and the outer peripheral surface of the elastic member is in direct contact with the inner surface of the clamp member along the spaced distance without a gap between the outer peripheral surface of the elastic member and the inner surface of the clamp member, and
wherein a clamping direction of the clamp member is in a direction that is through the outer peripheral surface of the elastic member toward the rod-like member.

11. A support structure comprising:
a rod-like member;
a clamp member disposed to surround the rod-like member, the clamp member including a main body and a flat plate attached to the main body along an interface;
a first rotary shaft extending from a first end of the main body and a second rotary shaft extending from a second end of the main body, the first rotary shaft and the second rotary shaft having an axis of rotation that is parallel to the interface; and
an elastic member disposed between the rod-like member and the clamp member,
wherein the support structure supports-the rod-like member inside the clamp member via the elastic member,
wherein the elastic member comprises a liquid impermeable material, and fills a space between the rod-like member and the clamp member,
wherein an outer peripheral surface of the elastic member is in direct contact with an inner surface of the clamp member around an entire circumference of the rod-like member without a gap into which cleaning fluid can enter and remain between the outer peripheral surface of the elastic member and the inner surface of the clamp member, and wherein the elastic member is removably mounted to the rod-like member in a direction substantially perpendicular to a lengthwise direction of the rod-like member.

\* \* \* \* \*